(12) United States Patent
Wang et al.

(10) Patent No.: US 10,225,749 B2
(45) Date of Patent: *Mar. 5, 2019

(54) METHOD AND APPARATUS FOR BASE STATION SELF-CONFIGURATION

(71) Applicant: Signal Trust for Wireless Innovation, Wilmington, DE (US)

(72) Inventors: Peter S. Wang, E. Setauket, NY (US); Ulises Olvera-Hernandez, Kirkland (CA); James M. Miller, Verona, NJ (US); Louis J. Guccione, East Chester, NY (US)

(73) Assignee: Signal Trust for Wireless Innovation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 15/797,418

(22) Filed: Oct. 30, 2017

(65) Prior Publication Data

US 2018/0049049 A1 Feb. 15, 2018

Related U.S. Application Data

(63) Continuation of application No. 14/815,300, filed on Jul. 31, 2015, now Pat. No. 9,807,623, which is a
(Continued)

(51) Int. Cl.
*H04W 24/02* (2009.01)
*H04L 12/18* (2006.01)
(Continued)

(52) U.S. Cl.
CPC .......... *H04W 24/02* (2013.01); *H04L 12/189* (2013.01); *H04W 8/20* (2013.01); *H04W 12/04* (2013.01);
(Continued)

(58) Field of Classification Search
CPC ....... H04W 24/02; H04W 8/20; H04W 12/04; H04W 12/06; H04W 88/08; H04W 92/20; H04L 12/189
See application file for complete search history.

(56) References Cited

U.S. PATENT DOCUMENTS

| | | |
|---|---|---|
| 5,613,211 A | 3/1997 | Matsuno |
| 6,418,127 B1 | 7/2002 | Laurent |

(Continued)

FOREIGN PATENT DOCUMENTS

| | | |
|---|---|---|
| CN | 1905588 | 1/2007 |
| CN | 1964556 | 5/2007 |

(Continued)

OTHER PUBLICATIONS

"Diffie-Hellman key exchange." *Wikipedia, The Free Encyclopedia*. Nov. 14, 2007, 14:45 UTC. Wikimedia Foundation, Inc. <http://en.wikipedia.org/w/index.php?title=Diffie-Hellman_key_exchange&oldid=178082936>, 6 pages.
(Continued)

*Primary Examiner* — Ajay Cattungal
(74) *Attorney, Agent, or Firm* — Volpe and Koenig, P.C.

(57) ABSTRACT

Disclosed is method and apparatus for operation of a base station in wireless communications, including self-configuration of the base station for secure and authenticated communications with other base stations.

22 Claims, 8 Drawing Sheets

Related U.S. Application Data continuation of application No. 13/910,971, filed on Jun. 5, 2013, now Pat. No. 9,100,849, which is a continuation of application No. 13/234,764, filed on Sep. 16, 2011, now Pat. No. 8,478,343, which is a continuation of application No. 11/964,596, filed on Dec. 26, 2007, now Pat. No. 8,024,000.

(60) Provisional application No. 60/882,079, filed on Dec. 27, 2006.

(51) Int. Cl.
*H04W 8/20* (2009.01)
*H04W 12/04* (2009.01)
*H04W 12/06* (2009.01)
*H04W 88/08* (2009.01)
*H04W 92/20* (2009.01)

(52) U.S. Cl.
CPC ............ *H04W 12/06* (2013.01); *H04W 88/08* (2013.01); *H04W 92/20* (2013.01)

(56) References Cited

U.S. PATENT DOCUMENTS

| | | | |
|---|---|---|---|
| 7,024,688 B1 | 4/2006 | Faccin et al. | |
| 7,099,694 B1 | 8/2006 | Aramaki et al. | |
| 2002/0123365 A1 | 9/2002 | Thorson et al. | |
| 2002/0151300 A1 | 10/2002 | Suda et al. | |
| 2002/0152378 A1* | 10/2002 | Wallace, Jr. | H04L 63/0428 713/168 |
| 2002/0193116 A1* | 12/2002 | Agrawal | H04L 29/12018 455/445 |
| 2003/0219010 A1 | 11/2003 | Peng | |
| 2005/0026597 A1* | 2/2005 | Kim | H04W 48/12 455/412.1 |
| 2005/0239484 A1* | 10/2005 | Park | H04W 88/181 455/466 |
| 2006/0123021 A1* | 6/2006 | Byers | H05K 7/1459 |
| 2007/0047451 A1* | 3/2007 | Lohr | H04L 1/1822 370/242 |
| 2007/0070959 A1 | 3/2007 | Almeroth et al. | |
| 2007/0105549 A1* | 5/2007 | Suda | H04W 28/16 455/426.2 |
| 2007/0173259 A1* | 7/2007 | Akihara | H04W 24/02 455/446 |
| 2007/0281708 A1* | 12/2007 | Bakhuizen | H04W 28/08 455/450 |
| 2009/0021572 A1* | 1/2009 | Garudadri | H04L 47/10 348/14.01 |
| 2009/0055541 A1* | 2/2009 | Sato | H04W 28/18 709/228 |

FOREIGN PATENT DOCUMENTS

| | | |
|---|---|---|
| EP | 1111845 | 6/2001 |
| EP | 1 365 609 | 11/2003 |
| GB | 2386287 | 9/2003 |
| GB | 2 392 799 | 3/2004 |
| JP | 07-193859 | 7/1995 |
| JP | 2000-354048 | 12/2000 |
| JP | 2003-249944 | 9/2003 |
| JP | 2003-274011 | 9/2003 |
| JP | 2004-509481 | 3/2004 |
| KR | 2005/0014984 | 2/2005 |
| KR | 2006-0063618 | 6/2006 |
| KR | 2007-0112281 | 11/2007 |
| RU | 2005107331 | 8/2005 |
| WO | 96/14720 | 5/1996 |
| WO | 00/69199 | 11/2000 |
| WO | 0077981 | 12/2000 |
| WO | 03/049486 | 6/2003 |
| WO | 05/051024 | 6/2005 |
| WO | 2005-125249 | 12/2005 |
| WO | 06/010953 | 2/2006 |

OTHER PUBLICATIONS

"IPsec." *Wikipedia, The Free Encyclopedia*. Nov. 14, 2007, 14:40 UTC. Wikimedia Foundation, Inc. <http://en.wikipedia.org/w/index.php?title=IPsec&oldid=178971633>, 6 pages.
"3$^{rd}$ Generation Partnership Project; Technical Specification Group Services and System Aspects; 3G Security; Security architecture (Release 5)"; 3GPP TS 33.102 V5.5.0 (Sep. 2004) 61 pages.
"3$^{rd}$ Generation Partnership Project; Technical Specification Group Services and System Aspects; 3G Security; Security architecture (Release 5)"; 3GPP TS 33.102 V5.7.0 (Dec. 2005), 61 pages.
"3$^{rd}$ Generation Partnership Project; Technical Specification Group Services and System Aspects; 3G Security; Security architecture (Release 6)"; 3GPP TS 33.102 V6.5.0 (Dec. 2005), 64 pages.
"3$^{rd}$ Generation Partnership Project; Technical Specification Group Services and System Aspects; 3G Security; Security architecture (Release 7)"; 3GPP TS 33.102 V7.1.0 (Dec. 2006), 61 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.3.1 (Nov. 2006)., 74 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007), 109 pages.
"3rd Generation Partnership Project; Technical Specification Group Radio Access Network; Evolved Universal Terrestrial Access Network (E-UTRAN); S1 Application Protocol (S1AP) (Release 8)" 3GPP TS 36.413 V8.0.0 (Dec. 2007), 125 pages.
"3rd Generation Partnership Project; Technical Specification Group Radio Access Network; Evolved Universal Terrestrial Radio Access Network (EUTRAN); X2 application protocol (X2AP) (Release 8)" 3GPP TS 36.423 V8.0.0 (Dec. 2007), 60 pages.
Ericsson "IP Multi-cast signalling for Application Protocols", 3GPP TSG-RAN WG3 # 54, Riga, Latvia, Nov. 6-10, 2006, Tdoc R3-061778, 7 pages.
Ericsson "Text Proposal on PDCP sublayer for TR 25.813, Section 5.3.3", 3GPP TSG-RAN WG2x #53, Shanghai, China, May 8-12, 2006, Tdoc R2-061716, 2 pages.
Kaufman, C., Ed. Internet Key Exchange (IKEv2) Protocol, RFC 4306, Dec. 2005, 83 pages.
Mao, Wenbo "Modern Cryptography", pp. 250-251, 2003.
Nokia "Discussion of threats against eNB and last-mile in Long Term Evolved RAN/3GPP System Architecture Evolution", 3GPP TSG-SA WG3 Security—S3#42, Feb. 6-9, 2006, Bangalore, India, S3-060034, 4 pages.
Nokia, Siemens, Ericsson, Vodafone, Huawei, . . . "Updated version of Rationale and track of security decisions in Long Term Evolved RAN/3GPP System Architecture Evolution", 3GPP TSG SA WG3 (Security) meeting #45, Ashburn, USA, Oct. 31-Nov. 3, 2006, S3-060706m 45 pages.
Stewart, "Stream Control Transmission Protocol," Network Working Group, Request for Comments: 4960 (Sep. 2007), 153 pages.
The Explanatory Dictionary of Computing, "Tolkovy Slovar po Vychislitelnoi Tekhnike," Moscow, the Publishing Department "Russkaya Redaktsia," p. 372 (1995). ‡.
"EUTRAN Architecture Description for 25.912," 3GPP TSG RAN WG3 Meeting #52, R3-060732 Shanghai, China, (May 8-12, 2006), 4 pages.
Huawei, Discussion of Some Solutions to Self-Configuration, 3GPP TSG-RAN WG3 Meeting #54 R3-061715, [ONLINE], Nov. 1, 2006, pp. 1-5.
NTT DOCOMO: "Clarification of functions for self-optimization and self-configuration", 3rd Generation Partnership Project (3GPP);

(56) References Cited

OTHER PUBLICATIONS

Technical Specification Group (TSG) Radio Access Network (RAN); Working Group (WG3) #53bis, No. R3-061509, Oct. 13, 2006, pp. 1-3.
3GPP TS 36.300 V0.1.0 (Oct. 2006), Technical Specification, 3rd Generation Partnership Project; Technical Specification Group Radio Access Network; Evolved Universal terrestrial Radio Access (E-UTRA) and Evolved Universal Terrestrial Radio Access Network (E-UTRAN); Overall description; Stage 2, pp. 1-51.
Ericsson, "Functionality for dynamic SFN for MBMS", 3GPP TSG-RAN2 Meeting #56 R2-063220, Riga, Latvia, Nov. 6-Nov. 10, 2006.
T-Mobile et al., "Self configuration & self optimization use cases," 3GPP TSG RAN WG3 meeting #54, R3-061974, (Nov. 6-11, 2006).
T-Mobile et al., "Self-Configuration and Self-Optimisation, Definition," 3GPP TSG-RAN WG3#53bis, R3-061613, Seoul, South Korea (Oct. 10-13, 2006).

* cited by examiner

I: INITIATOR
R: RESPONDER
A: ATTACKER

LET $p$ BE A LARGE PRIME NUMBER AND $g$ A GENERATOR OF THE MULTIPLICATIVE GROUP $F_p^*$.

INITIALLY $I$ PICKS $x$, $A$ PICKS $m$, AND $R$ PICKS $y$, ALL INTEGERS UNIFORMLY SELECTED FROM THE INTERVAL $[1, p-1)$

1. $I \rightarrow A(R)$: $HDR_I$, $SA_I$, $g_I^x$, $N_I$ (NOTE: $A(R)$ DENOTES $A$ RECEIVING MESSAGE INTENDED FOR $R$)

2. $A(I) \rightarrow R$: $HDR_I$, $SA_I$, $g_I^m$, $N_I$ (NOTE: $A(I)$ DENOTES A MESSAGE FROM $A$ BUT IS ASSUMED BY THE RECIPIENT $R$ TO BE FROM $I$)

3. $R \rightarrow A(I)$: $HDR_R$, $SA_R$, $g_R^y$, $N_R$

4. $A(R) \rightarrow I$: $HDR_R$, $SA_R$, $g_R^m$, $N_R$

5. $I \rightarrow A(R)$: $HDR_I$, $SK\{ID_I, CERT_I, AUTH, SA2_I, ..., $ OTHER FIELDS TO CREATE CHILD SAs$\}$ 6. $A(I) \rightarrow R$: $HDR_I$, $SK\{ID_I, Cert_I, AUTH, SA2_I, ..., $ OTHER FIELDS TO CREATE CHILD SAs$\}$ 7. $R \rightarrow A(I)$: $HDR_R$, $SK\{ID_R, Cert_R, Sig_R, AUTH, SA2_R, ..., $ OTHER FIELDS TO CREATE CHILD SAs$\}$ 8. $A(R) \rightarrow I$: $HDR_R$, $SK\{ID_R, Cert_R, Sig_R, AUTH, SA2_R, ..., $ OTHER FIELDS TO CREATE CHILD SAs$\}$

METHOD AND APPARATUS FOR BASE STATION SELF-CONFIGURATION

CROSS REFERENCE TO RELATED APPLICATIONS

This application is a continuation of U.S. patent application Ser. No. 14/815,300, filed Jul. 31, 2015, which is a continuation of U.S. patent application Ser. No. 13/910,971 filed on Jun. 5, 2013, which issued as U.S. Pat. No. 9,100,849 on Aug. 4, 2015, which is a continuation of U.S. patent application Ser. No. 13/234,764 filed on Sep. 16, 2011, which issued as U.S. Pat. No. 8,478,343 on Jul. 2, 2013, which is a continuation of U.S. patent application Ser. No. 11/964,596 filed on Dec. 26, 2007, which issued as U.S. Pat. No. 8,024,000 on Sep. 20, 2011, which claims the benefit of U.S. Provisional Application No. 60/882,079 filed Dec. 27, 2006 which is incorporated by reference as if fully set forth.

FIELD OF INVENTION

The present application is related to wireless communications. More particularly, the present application is related to self-configuration and security features of a base station in wireless communications.

BACKGROUND

The 3rd Generation Partnership Project (3GPP) has initiated the Long Term Evolution (LTE) program to bring new technology, new network architecture, new configurations, new applications and new services to wireless cellular networks in order to provide improved spectral efficiency and faster user experiences.

While the demands continue for greater functionality, low maintenance LTE systems, particularly in terms of network deployment and runtime service optimization, are also in demand.

Figure 1:
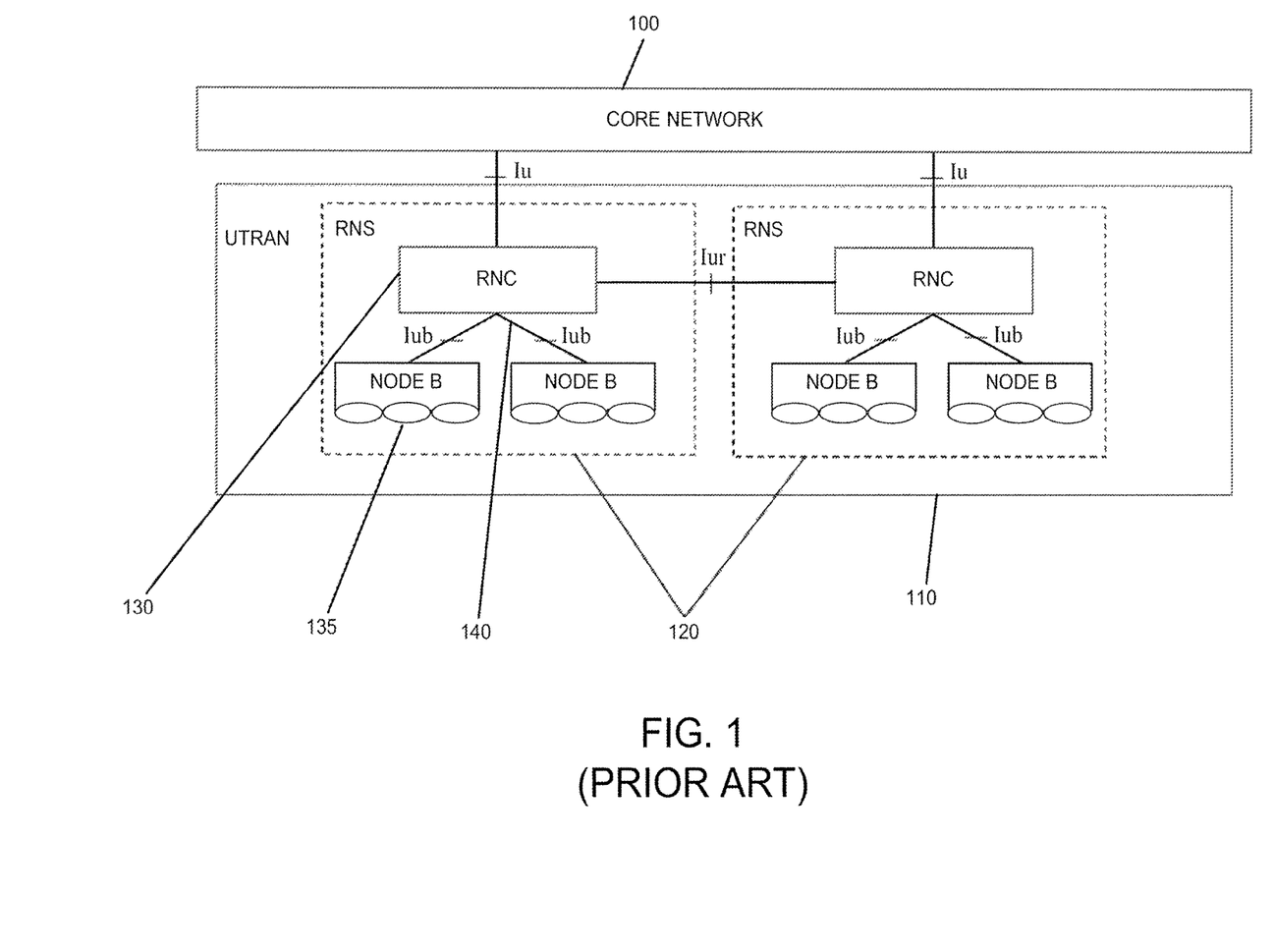
FIG. 1 is a block diagram of an existing wireless communication system.

The UTRAN architecture used prior to LTE, the 3GPP Universal Mobile Telecommunication System (UMTS) system, is shown in FIG. 1. The core network 100 communicates with the UTRAN 110 that consists of multiple radio network systems (RNS) 120. Each RNS consists of a radio network controller (RNC) 130 and one or more Node-Bs 135. The configurations and operations of the deployed Node-Bs 135 are totally controlled by the RNC 130 with explicit commands over the Iub link 140. Iub 140 is an RNC-to-Node-B interface that has been previously defined. The configurations and service upgrade of Node-Bs depend on the RNC and other cell engineering and planning efforts. Prior to LTE, no connections existed between UTRAN Node-Bs 135 and no requirements existed for self configuration and optimization. No means of self configuration and no defined procedures operating among Node-Bs existed.

Figure 2:
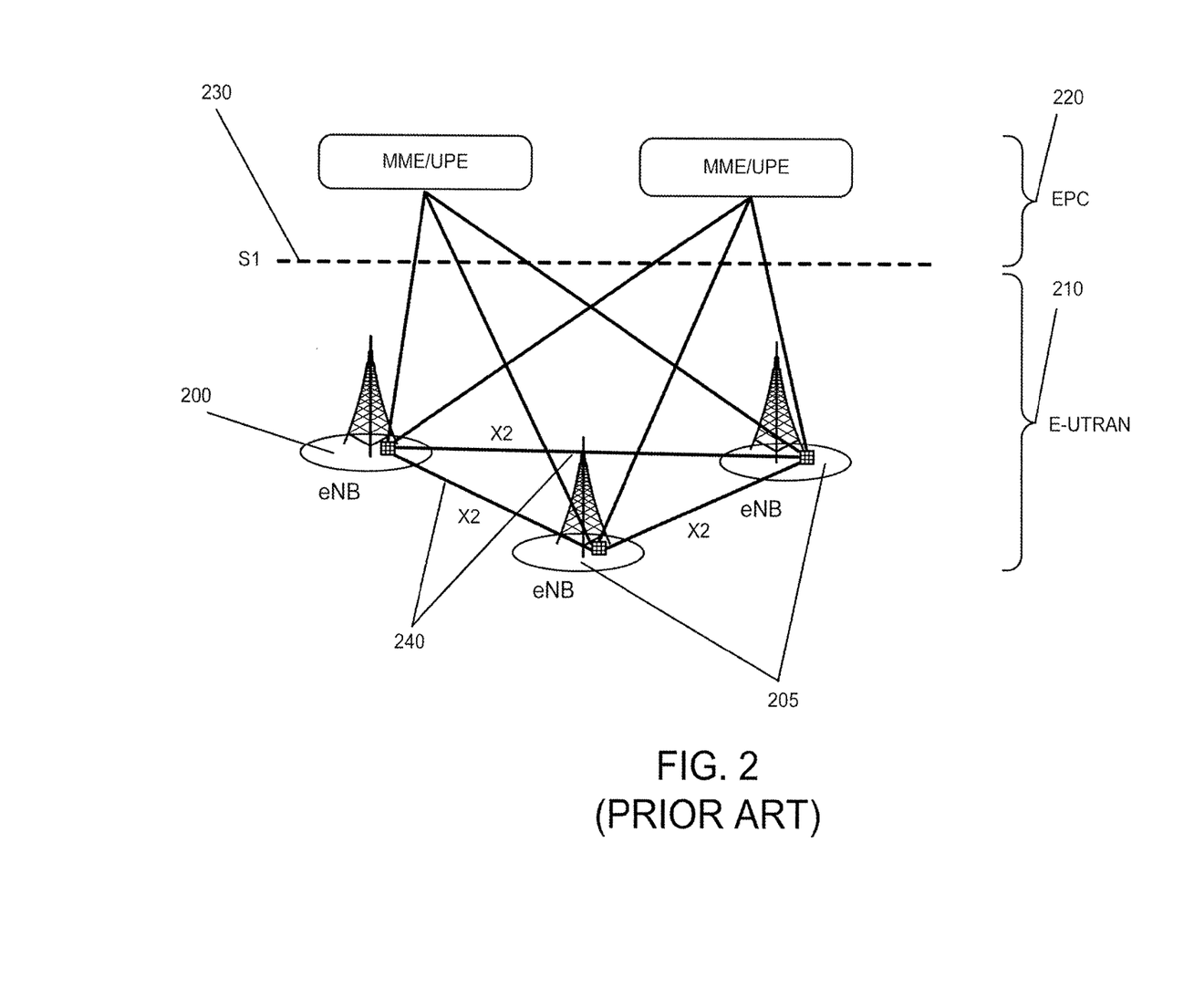
FIG. 2 is an illustration of an existing LTE architecture.

In the new LTE network system, as illustrated in FIG. 2, the E-UTRAN architecture has been changed. The former RNC node no longer exists. The evolved-Node-Bs (eNBs) 200, 205 perform the radio access network functionality for E-UTRAN 210, are linked directly with the Core Network (EPC) 220, and are linked together among themselves. In the E-UTRAN, the new eNBs 200, 205 assume the RAN configuration, operation and management control functions as well as the radio interface configurations and operations. Furthermore, each new eNB such as 200, now interacts directly with the LTE Core Network 220 over the S1 interface as well as interacting with neighboring eNBs 205 over the X2 interface 240 and X2 connection control (X2C) interface (not shown) for handling wireless transmit/receive unit (WTRU) mobility management tasks on behalf of the new E-UTRAN.

When a newly deployed eNB 200, 205 powers up, it performs self configuration tasks, including operations over the X2C interface to interact with neighboring operational eNBs. This initial interaction is used to gather information, to certify the eNB and to enable configurations and cooperation as the eNB readies itself to enter E-UTRAN operational mode for serving the WTRUs in its coverage area.

SUMMARY

The present application is related to operating procedures over a connection between base stations at a self-configuration phase.

Operations are disclosed for a self-configuring base station, and communication with connected neighboring base stations. A newly deployed base station performs the self configuration to associate itself with its neighboring operational base stations or cells. Security procedures are performed to protect the network from certain attacks.

DETAILED DESCRIPTION OF EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Although embodiments are described here in the context of LTE, they should be construed as examples and not limited to this particular wireless technology.

FIGS. 3-6 depict time sequences of events occurring in a self-configuring eNB, an eNB connected to (that is, "neighboring") the self-configuring eNB, and an access gateway. The sequence begins at the top with time progressing downward. Events at the same horizontal level are occurring simultaneously.

Figure 3:
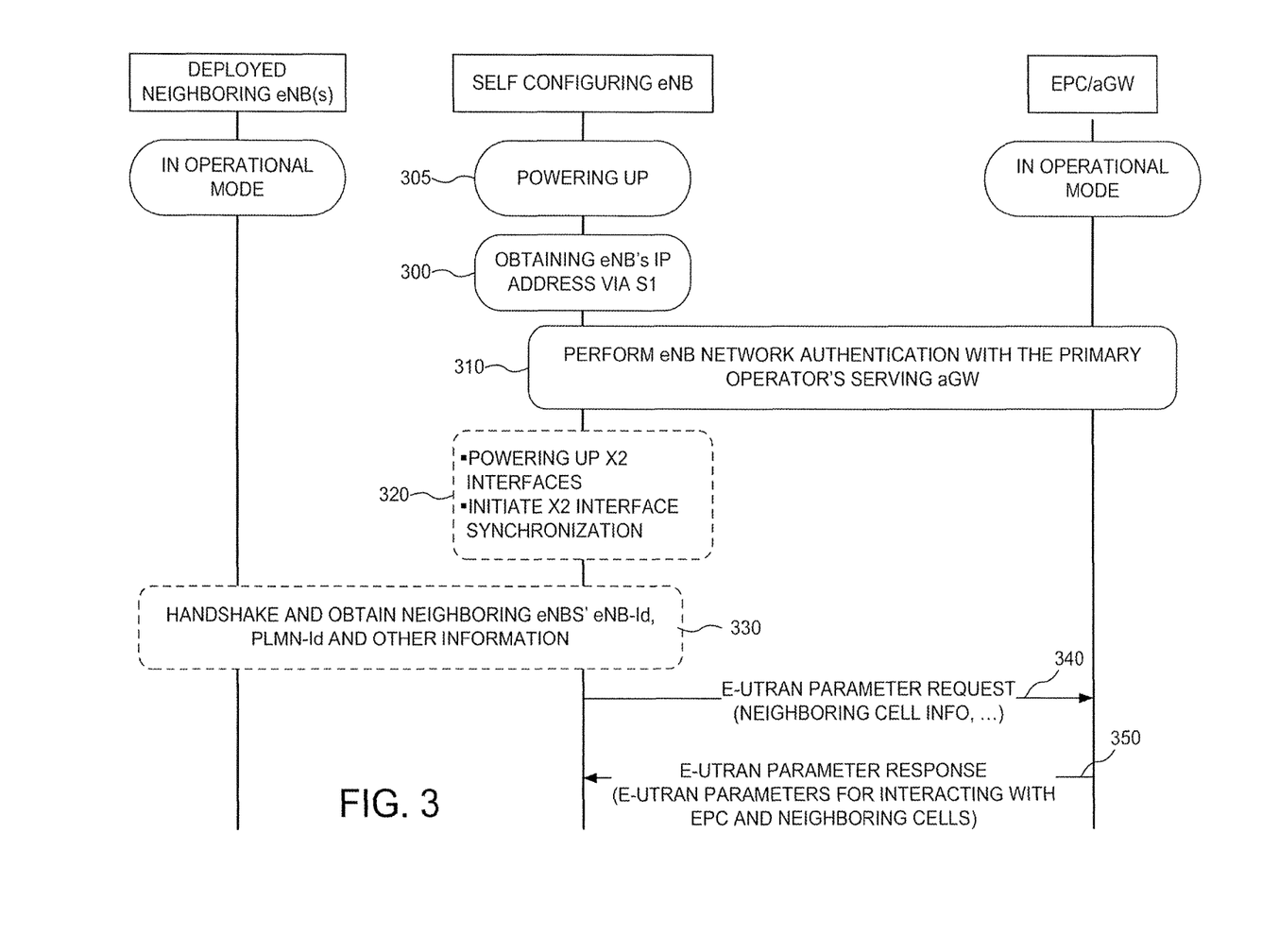
FIG. 3 is a flow diagram of one embodiment of a method of the present disclosure.

Referring now to FIG. 3, when the self configuring eNB powers up, its S1 interface is preferably powered up first (step 305). The general internet protocol (IP) function or the eNB specific IP address resolution function obtains a unique IP address for the self configuring eNB over the S1 interface (step 300). The self-configuring eNB will then perform the eNB network authentication with its primary operator's serving access gateway (aGW) (step 310).

When the self-configuring eNB has succeeded with its network authentication, it then powers up and initializes (step 320) with its IP address, either configured or obtained through the S1 interface or the X2 interfaces, which connect the self-configuring eNB with other neighboring LTE eNBs.

Figure 7:
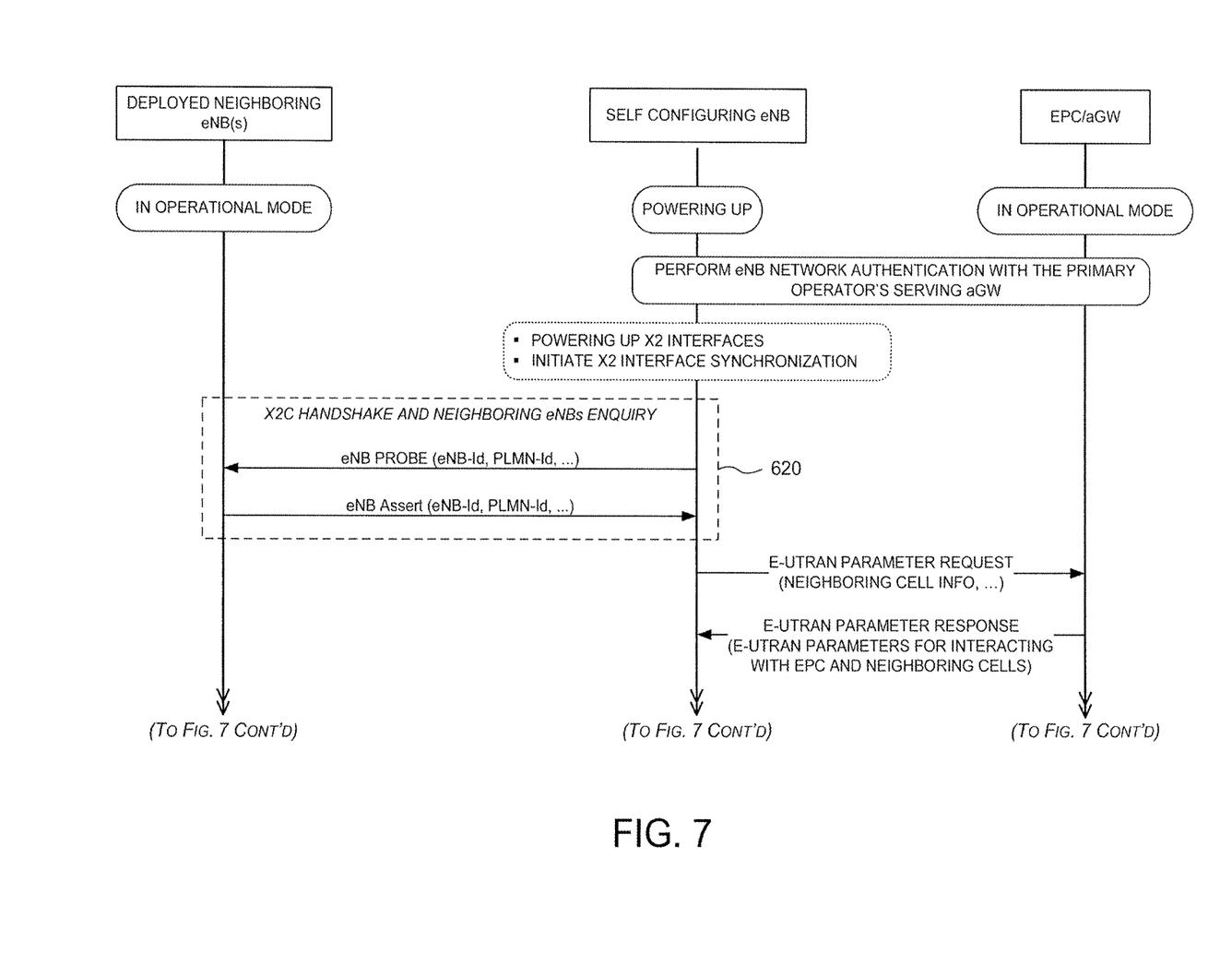
FIG. 7 is a flow diagram of a fourth embodiment of a method of the present disclosure.

As an optional early action, the eNB may then obtain the identities of its X2-connected neighboring eNBs, for example, their eNB-Id(s) and/or Cell-Id(s), public land mobile network (PLMN)-Id(s) and other non-confidential information such as current operating status (step 330). The eNB may then inform the serving aGW so that the eNB acquires the necessary network instructions and/or authorizations in connection with the X2-connected neighboring eNBs for authorized and permitted operations, such as WTRU handover or eNB measurement and report retrieval. Although this optional early action (step 330) is shown in FIG. 3 as a "handshake" it could also be a pair of request and response messages as shown in FIG. 7 or any other appropriate procedure. The neighboring eNBs to be contacted for such information are those that are pre-configured in the default neighboring eNBs list, such as those stored in the UMTS integrated circuit card (UICC) device.

This method for early action enables the network to maintain certain input or control over the inter-E-UTRAN operations in a multi-vendor/multi-operator environment. First, the process allows the eNB to gather accurate neighboring eNB information from those eNBs that respond in comparison with the pre-configured neighboring eNB list so that the eNB can inform the network/EPC about the new eNB and its connected neighbors and their actual operating status. Second, the eNB can obtain operational guides from the network regarding the policies of the X2C interface with the neighboring LTE eNBs, as the neighboring eNBs may or may not belong to the same network provider/operator. The eNB may also obtain other important operational information.

The one-way optional collection by the self-configuring eNB of its neighbor's non-confidential information does not include sensitive information retrieval. The collection of sensitive information by an eNB from its neighbors occurs at a later stage, when the inter-eNB authentication and security key associations have taken place.

After the initial data collection, the eNB will then send an E-UTRAN parameter request 340 over S1 with the information it obtained in the early X2C step disclosed above. Alternatively, the eNB will send the Request over the S1 if the early X2C action is not taken. In an E-UTRAN parameter response 350, the self-configuring eNB obtains needed operating parameters for the E-UTRAN, including parameters for inter-eNB authentication and security key agreement procedures over X2C, such as a universal eNB credential, a universal eNB shared secret key, inter-eNB security algorithm to be used and a universal eNB security keyset.

A need for authenticity, integrity and confidentiality protection on X2C has been previously documented. A lightweight authentication, defined herein as the inter-eNB authentication, and integrity and/or ciphering key agreement, defined herein as the security key association procedure, are disclosed below for LTE inter-eNB authentication and security key association between any pairs of eNBs, including between a self-configuring eNB and its already deployed operational neighboring eNBs.

Note that the inter-eNB authentication procedure in the eNB self configuration is required to ascertain the authenticity of the eNB pair at the node level. Authentication performed below without the node level control and the node level parameter's participation would not guarantee the same level of eNB authenticity.

Two embodiments are disclosed, one utilizing the underlying Internet Protocol Security (IPsec) with improvements and one for direct interactions at eNB level with underlying IPsec in "Manual" mode.

The first embodiment utilizes the underlying Internet Protocol Security eNB-to-eNB communication for LTE and is structured around the standard TCP/IP protocol suite. An understanding of existing internet protocol security and its potential weaknesses is helpful for appreciation of the novelty of this embodiment, and therefore a description thereof follows.

Within TCP/IP protocol, domain protection of IP header information is considered to be critical in preventing the typical attacks which result in address spoofing and which often lead to session hijacking. Network layer authentication and confidentiality are thus employed using a set of Internet Engineering Task Force (IETF) standardized processes called Internet Protocol Security (IPSec). Authentication, which in this context means data integrity and source address protection, is mandatory for IPSec, while confidentiality (encryption) is not.

The three basic components of IPSec are Authentication Protection, Confidentiality Protection, and Security Association. The authentication and confidentiality protection mechanisms are implemented via additional fields in the IP packet. The field for authentication, which is mandatory in IPSec, is the Authentication Header (AH). It is positioned immediately following the IP header. This field contains various subfields that specify the cryptographic algorithms to be used, a sequence number for replay prevention, and integrity hashing referred to as the Integrity Check Value (ICV).

The confidentiality field, which follows the authentication field, is optional and is called the Encapsulating Security Payload (ESP). It contains subfields similar to AH: specification of a unique encryption algorithm, such as DES, AES, 3DES or BLOWFISH, a sequence number subfield, the encrypted payload data, and a subfield containing a hash to integrity protect the encrypted data. The hash employed for ESP protects the integrity of just the encrypted data, whereas the AH hash protects the entire IP packet which, as indicated for IPSec, always includes the AH field and sometimes the ESP field.

To determine whether authentication and confidentiality, as opposed to just authentication, is used, a security association (SA) is set up in IPSec. The SA consists of three parts: a specification of the security algorithms and other parameters, the IP destination address, and an identifier for AH or ESP. The SA is implemented through the Internet Key Exchange (IKE) Protocol, described as follows.

Before any authentication/integrity and confidentiality can be used in IPSec, cryptographic keys, algorithms and parameters have to be negotiated. The IKE protocol contains many protocols for the required negotiation and is used in a variety of scenarios. A simplified view of the IKE protocol is described and related to the present disclosure below.

The initial exchanges between an initiator and a responder establish the initial security association. These exchanges consist of two sets of request/response pairs or a total of four messages.

The first pair establishes cryptographic algorithm usage and performs a Diffie-Hellman exchange to arrive at a seed from which integrity and confidentiality keys are derived. The second pair uses the keys generated from the first exchange to authenticate the first set of messages, swap identities as well as certificates, and provide setup for follow-on child SAs.

The initiator (I) of the protocol sends the following payload:

1. I→R: $HDR_I$, $SA_I$, $g_I^x$, $N_I$

The responder (R) responds with:

2. R→I: $HDR_R$, $SA_R$, $g_R^y$, $N_R$

This is the first pair of messages of the initial security association. HDR contains header information which primarily maintains the state of the communication between the two entities. $SA_I$ and $SA_R$ are the security algorithm and parameter negotiation mechanisms, where the initiator proposes the set of choices from which the responder chooses. To process the Diffie-Hellman protocol the values $g_I^x$ and $g_R^y$ are exchanged to produce the shared secret value $g^{xy}$ which serves as the seed to generate the integrity and confidentiality keys using the prior negotiated algorithms. The quantity g is a generator of the cyclic group $F_p^*$ (order p−1), where p is a very large prime number. The values p and g are publicly known and all calculations are performed mod p. Lastly, the nonces $N_R$ and $N_I$ are exchanged to prevent replay.

The second pair of messages is

3. I→R: $HDR_I$, SK{$iD_I$, $Cert_I$, AUTH, $SA2_I$, . . . , other fields to create child SAs}

4. R→I: $HDR_R$, SK{$ID_R$, $Cert_R$, $Sig_R$, AUTH, $SA2_R$, . . . , other fields to create child SAs}

Messages three and four are somewhat simplified from what is specified in the IETF protocol. This second pair employs security key information derived from the first message pair, as stated above. The SK designates a security key operation on the argument shown inside the braces. Two security keys, SK_a (authentication, meaning integrity here) and SK_e (encryption) are generated from $g^{xy}$ (from Diffie-Hellman). They are used to protect the integrity and confidentiality, respectively, of the exchange. The initiator and responder identities ($ID_I$ and $ID_R$) and their corresponding identity secrets are proven by each entity to the other; AUTH contains the integrity check values for each direction. The certificates ($Cert_I$ and $Cert_R$) provide keying information, apart from SK_a and SK_e, to verify AUTH in both directions.

As long as no eavesdropping of messages 1 and 2 occurs, the SA established between initiator and responder is secure for subsequent child exchanges to take place. However, this initial pair of messages may be vulnerable to a type of the well-known "man-in-the-middle attack" in which an attacker can force each valid entity to use key seeds that it can exploit. The attack described here compromises the entire communication process between initiator and responder, where the attacker is able to masquerade as each one.

Figure 6:
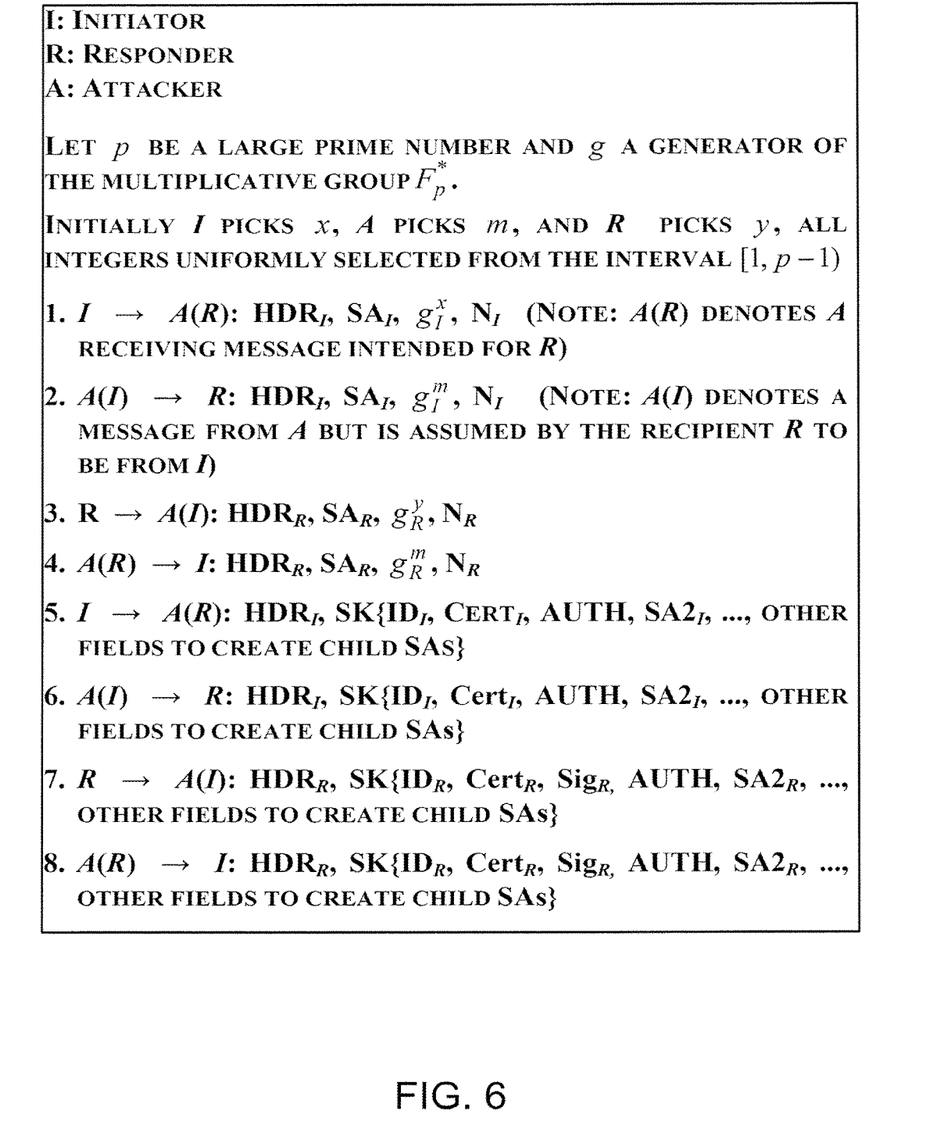
FIG. 6 shows a known type of security breach.

A typical man-in-the-middle attack for the initial IKE exchange between I and R is shown in FIG. 6. In steps 1 through 4, A receives $g_I^x$ from I and $g_R^y$ from R; moreover A sends $g_R^m$, its Diffie-Hellman value, to I and R, where both assume that the other was the originator of that value instead of the real originator A. Knowing the information that each party has it is easy to show that A shares the Diffie-Hellman seeds $g^{mx}$ and $g^{my}$, respectively, with the valid communicators I and R. A now computes the same encryption (SK_e) and authentication/integrity (SK_a) keys as using $g^{mx}$ and similarly with R using $g^{my}$.

The SK functions in steps 5 through 8 do not protect either integrity or the confidentiality of the messaging, given that A has spoofed the communications by orchestrating the key usage and successfully masquerading as both I and R. The absence of any pre-shared secret key information prevents the protection of the first two exchanges between I and R. Method and apparatus embodiments for preventing this type of attack are described below.

A first embodiment is shown in FIG. 7, feature 600. At node levels $eNB_1$ and $eNB_2$, (such as the self-configuring eNB and a neighboring eNB, as described above and shown in FIG. 7)) the eNBs share a network distributed secret key $K_s$ which is only known by $eNB_1$ and $eNB_2$.

With such a node level strong secret, the initial exchange between I (initiator) and R (responder) can be protected by the following pair of messages 600:

1. $eNB_1 \rightarrow eNB_2$: $HDR_1$, $SA_1$, $g_1^x$, $N_1$, {$HDR_1$, $SA_1$, $g_1^x$, $N_1$}$_{Ks}$ 2. $eNB_2 \rightarrow eNB_1$: $HDR_2$, $SA_2$, $g_2^y$, $N_2$, {$HDR_2$, $SA_2$, $g_2^y$, $N_2$}$_{Ks}$ The symbols correspond to those defined above. For IPsec messages 1 and 2, the braces notation denotes that message authentication code (MAC) values are added, each representing a hash using the authentication/integrity key, i.e. the shared secret $K_s$, of all the components of, respectively, each message. Each hash with $K_s$ protects its corresponding IPsec message. If, following the attack shown in FIG. 6, that is, a Man-in-the-middle Attack, the attacker attempts to send $g_I^m$ to R or $g_R^m$ to I, the hash (MAC) in the corresponding message will not agree with that computed by the recipient of the message. As a result, such attempts, or any spoofing attempts, will be detected and defeated. FIG. 7 illustrates this improved IPsec Security Association with respect to the X2C eNB authentication and key association operations.

Figure 4:
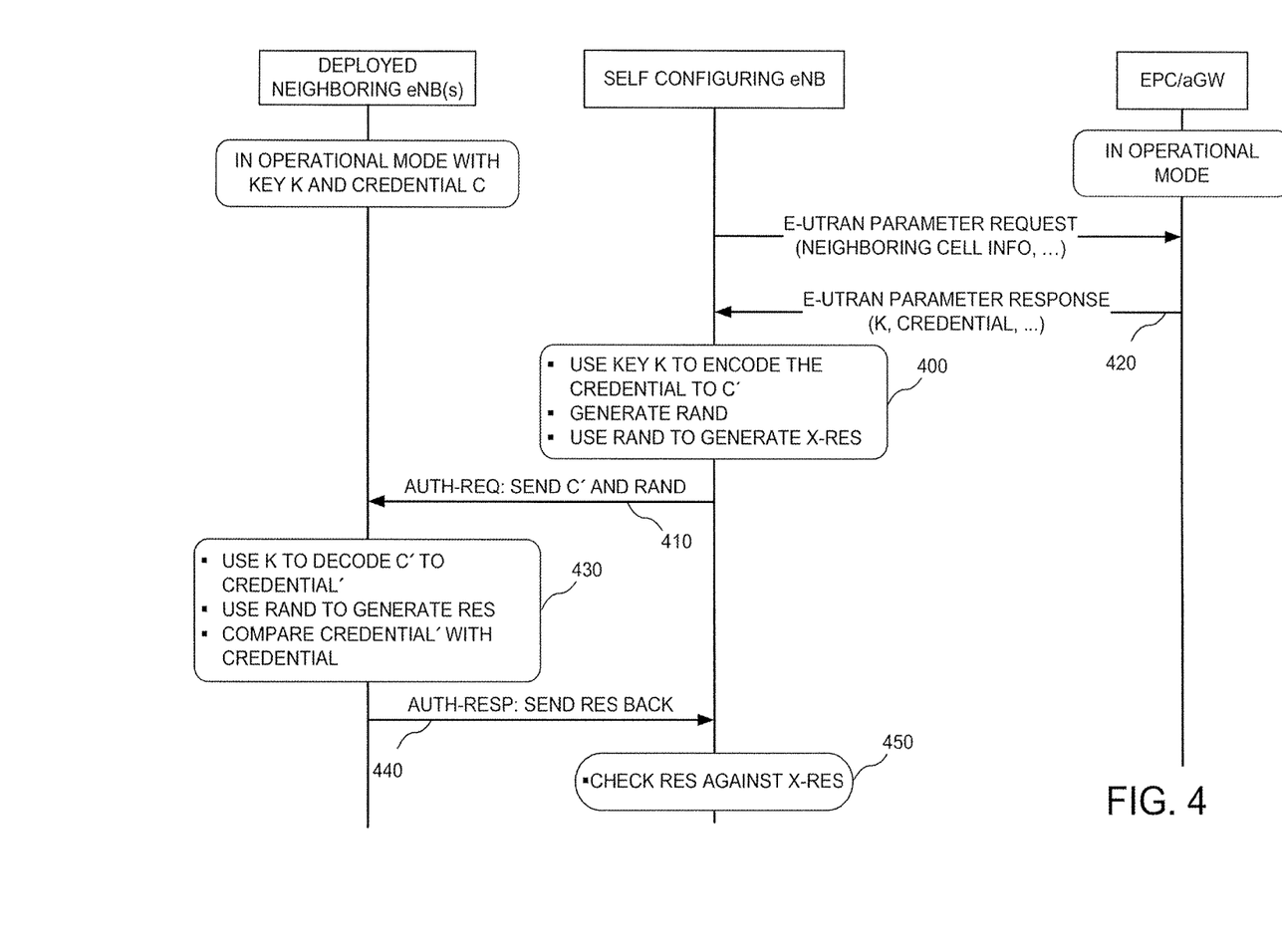
FIG. 4 is a flow diagram of a second embodiment of a method of the present disclosure.

In a second embodiment indicated at step 630 in FIG. 7 and detailed in FIG. 4, direct eNB authentication is done over the X2C. To guard against possible hijack/replacement or other tampering of surrounding eNBs, a light-weight authentication is disclosed herein to make sure that inter-eNB authentication is assured at the node level. This is opposed to the assumption that the neighboring eNBs are all protected endpoints already, as shown in FIG. 4, between any two pairs of eNBs in LTE.

Referring to FIG. 4, the LTE network prepares a universal shared secret key K and a universal shared eNB credential C for all LTE eNBs for inter-eNB authentication. In an E-UTRAN parameter response 420, the self-configuring eNBs obtain the parameters over the S1 channel from the network after the eNBs are network authenticated. The LTE also standardizes authentication algorithms Fx and Fy, described further below.

The self-configuring eNB uses the key K and the security algorithm Fx to encrypt the credential C at step 400. The resulting encrypted credential C' is transmitted in an Auth-Req signal 410 to the neighboring eNB and used by the neighboring eNB to authenticate the self-configuring eNB. The self-configuring eNB also selects a random number (RAND) (step 400) and uses the Fx algorithm to compute an encrypted authentication value X-RES from RAND. Both the C' and the RAND are transmitted to the neighboring eNB(s) (step 410).

The receiving neighboring eNB(s) then use the shared secret key K and Fx to decode C' and compare the result with the universal eNB credential C (step 430), which it has in memory. It also uses the received RAND to compute a decrypted authentication value RES using the Fy function. The RES is then sent back in an Auth-Resp signal 440 to the self-configuring eNB to for it to authenticate the neighboring eNB(s) (step 450).

This simplified light-weight inter-eNB authentication avoids the lengthy computations on the SQN, AK, AMF and MAC in the current UMTS UE authentication procedure prior to LTE in order to reduce the security computational load as well as to reduce the signaling message size over X2C.

Returning to FIG. 7, there also may be eNB security key association 630 over X2C. Given that IPsec will be deployed for LTE X2 connections, the use of IPsec and its related IKE-v2 in "Manual" mode with LTE eNB supplied security keys is disclosed with only ciphering performed by IPsec. This ensures the control of X2C security and keys by the LTE via an eNB, ensuring a high security threshold.

For an LTE eNB controlled security key association (for integrity protection and ciphering) the following options are proposed:

First, LTE may standardize an X2C security protection algorithm Fa among all LTE eNBs. The algorithm Fa may be a currently employed algorithm, such as the UMTS f8, or a new algorithm that allows encryption and decryption of information with a shared security key, for example X2C-key.

Second, LTE may standardize a universal set of security keys (which may be chosen for the best security results of the Fa) for the security applications (integrity protection and ciphering) among eNBs over the X2C interface, that is, an indexed set of N keys known to all LTE eNB sites may be defined.

Third, this universal keyset for LTE X2C security operations may be downloaded from the serving aGWs to the self-configuring eNB after the network authentication procedures, such as at the signaling exchange "E-UTRAN Parameter Response" 350. The security key set download to each LTE eNB may occur at the eNB's self configuration stage when the eNB is in the pre-operational mode and thus able to afford the signaling load processing. Existing operational eNBs already have the key set stored.

Fourth, the security key or keys, if there is one for integrity protection and another for deciphering, may be individually chosen or associated between any pairs of two eNBs over an X2C interface, at the self configuration stage, association stage, or at a later operating stage for re-association. In the association stage, only a key index needs to be mutually determined to enable the use of an agreed single security key. This approach benefits the increased security threshold by not sending the root values of the security keys in the message exchange, as in the prior art, reducing computational load by directly deriving the security keys and reducing signaling size in the key agreement message exchange.

Figure 5:
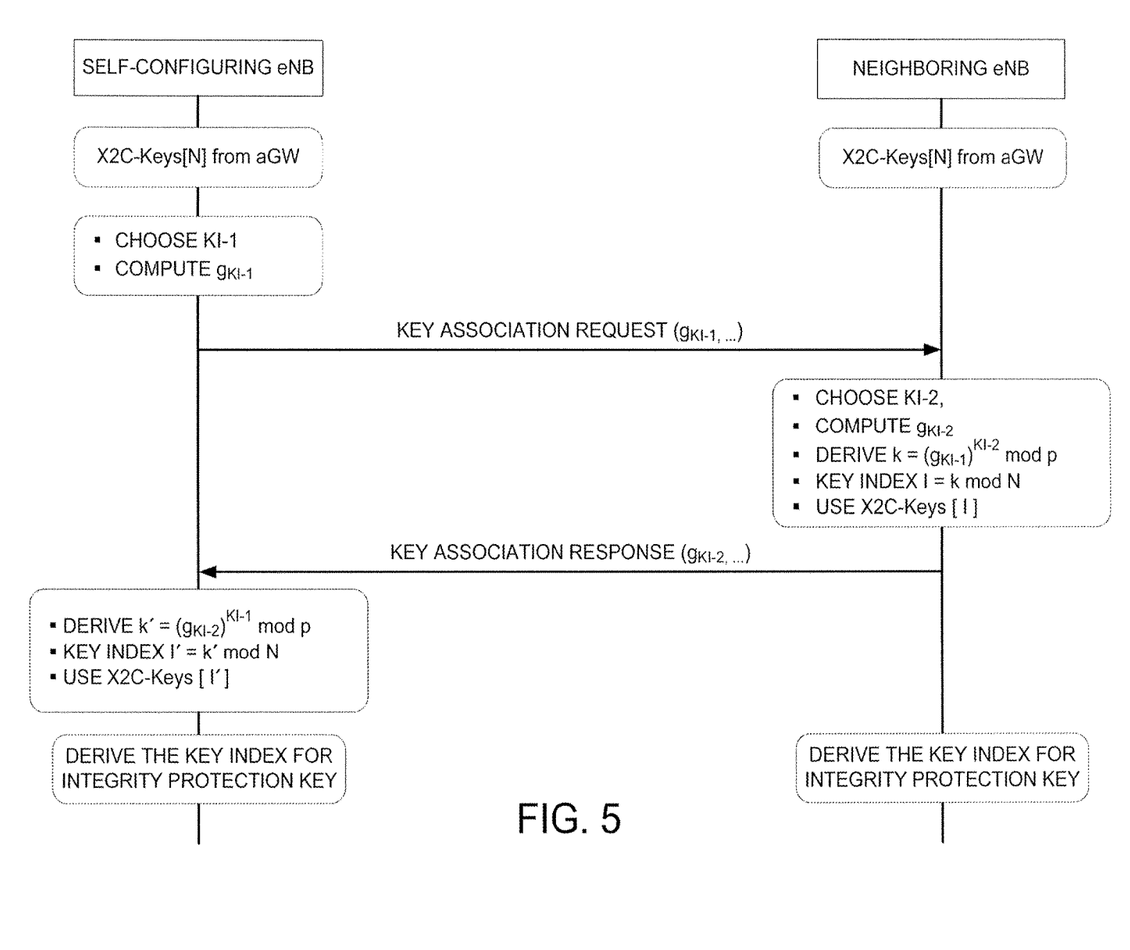
FIG. 5 is a flow diagram of a third embodiment of a method of the present disclosure.

Fifth, at the key agreement step, for the same set of the N number of X2C-Keys, the Diffie-Hellman key indexing method may be used to mutually reach the same key index I such that the security key X2C-key[i] will be used for the intended integrity protection and/or the ciphering operation. This is shown in FIG. 5.

Sixth, the derived security key may be used for both the integrity protection and the ciphering. Alternatively, a different security key may be desired for each operation. In that case one option is to run the same key index exchange procedure separately, in series or parallel, for the other key. An alternative option is to add an offset number to the already obtained key index and then take the modulo N operation again to achieve a new index [0, N−1]. The offset can be obtained by using a number known only to the two sites, for example an identity number such as the self-configuring eNB-Id.

All options (and others within the scope of the invention) can also be run periodically, even when the eNBs are in operational mode, to reselect (re-associate) the security keys. This will reduce the chances of security being broken under long lasting attack attempts.

The inter-eNB authentication and the security key association between the self-configuring eNB and its neighboring eNB(s) can be combined together to achieve both inter-eNB authentication and the security association in one exchange, as shown in FIG. 7, which illustrates overall self-configuring eNB operations over X2C with respect to connected neighboring eNBs.

The inter-eNB operations in FIG. 7 look like a point to point operation, but, from the eNB point of view, it is a point to multi-point operation. Therefore, multicast can be used by the self-configuring eNB if underlying IP layer supports such operation. But each neighboring eNB must respond to the self-configuring eNB individually.

Note that in FIG. 7, the X2C handshake 620 is optional, a described above in reference to FIG. 3. Also, the Alt-1 in the inter-eNB authentication and security key agreement 600 is that described above, where the first two IPsec_Init_SA message are integrity protected. The rest of the IPsec steps can then be carried out as the IPsec normal needs.

If authentication or key exchange fails, with the failure decision being based on several consecutive failed attempts, the self-configuring eNB shall consider the X2C interface invalid and report to the network.

The following E-UTRAN (eNB) parameters may be obtained from the neighboring eNB parameter exchange operation 610: GPS location information; the number of cells the eNB operates and the cell-Id(s); service operator's identity or home PLMN Id; eNB measurement or measurement group/association information; radio parameters for the Cell(s), such as frequency band and center-frequency, cell transmit bandwidth value, power control information, baseline cell common channel configurations, Multiple Input Multiple Output (MIMO) and directional antenna information, Multimedia Broadcast Multicast Service (MBMS) over a Single Frequency Network (MBMS SFN) information, and MBMS resource information; and service parameters for the Cell(s), such as MBMS information, location services (LCS) information, and common system information (SI) information shared among eNBs.

Although the features and elements disclosed are described in the embodiments in particular combinations, each feature or element can be used alone without the other features and elements of the embodiments or in various combinations with or without other features and elements of the present disclosure. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A self-configuration method implemented in an authenticated evolved NodeB (eNB) configured for use in a Long Term Evolution (LTE) network, the method comprising:
   receiving, by the authenticated eNB, first parameters from a core network via an interface, wherein the first parameters are configuration parameters for the authenticated eNB;
   communicating, by the authenticated eNB, information with another eNB via an inter-station interface to establish a link with the eNB; and
   receiving, by the authenticated eNB, second parameters from the another eNB via the inter-station interface, wherein the second parameters comprise information identifying each of a plurality of cells served by the another eNB.

2. The method of claim 1, further comprising:
   configuring the inter-station interface based on the first parameters.

3. The method of claim 1, wherein the second parameters comprise at least one of:
   location information of the another eNB,
   a cell-Id associated with each of a plurality of cells served by the another eNB,
   service operator's identity or home public land mobile network (PLMN) Id,
   eNB measurement or measurement group/association information of the another eNB,
   radio parameters for each cell served by the another eNB, and
   service parameters for each cell served by the another eNB.

4. The method of claim 3, wherein the radio parameters for each cell served by the another eNB comprise at least one of:
   frequency band(s) served,
   cell transmit bandwidth,
   power control information,
   baseline cell common channel configurations,
   Multiple Input Multiple Output (MIMO) and directional antenna information,
   Multimedia Broadcast Multicast Service (MBMS) over a Single Frequency Network (MBMS SFN) information,
   current operation status, and
   MBMS resource information.

5. The method of claim 3, wherein the service parameters for each cell served by the another eNB comprise at least one of:
   MBMS information,
   location services information, and
   common system information shared among eNBs served by the another eNB.

6. The method of claim 1, further comprising before the step of receiving the first parameters:
   transmitting, by the authenticated eNB to the core network, a request for the first parameters.

7. The method of claim 1, further comprising before the step of receiving the second parameters:
   transmitting, by the authenticated eNB to the authenticated another eNB, a request for the second parameters.

8. The method of claim 1, wherein the information at least includes a unique Internet Protocol (IP) address and wherein authentication of the eNB with the another eNB uses the unique IP address.

9. The method of claim 1, wherein authentication of the eNB with the another eNB includes either a handshake or paired request and response messages.

10. The method of claim 1, wherein the inter-station interface is an X2 interface.

11. The method of claim 1, wherein the information identifying each of the plurality of cells served by the another eNB are cell-Ids.

12. An authenticated evolved NodeB (eNB) configured for use in a Long Term Evolution (LTE) network comprising:
   a first interface;
   a second interface; and
   a processor communicatively coupled to the first interface and the second interface;
   wherein the processor is configured to:
      receive, by the authenticated eNB, first parameters from a core network via an interface, wherein the first parameters are configuration parameters for the authenticated eNB;
      communicate, by the authenticated eNB, information with another eNB via an inter-station interface to establish a link with the eNB; and
      receive, by the authenticated eNB second parameters from the another eNB via the inter-station interface, wherein the second parameters comprise information identifying each of a plurality of cells served by the another eNB.

13. The eNB of claim 12, wherein the processor further:
   configures the second interface based on the first parameters.

14. The eNB of claim 12, wherein the second parameters comprise at least one of:
   location information of the another eNB,
   a cell-Id associated with each of a plurality of cells served by the another eNB,
   service operator's identity or home public land mobile network (PLMN) Id,
   eNB measurement or measurement group/association information of the another eNB,
   radio parameters for each cell served by the another eNB, and
   service parameters for each cell served by the another eNB.

15. The eNB claim 14, wherein the radio parameters for each cell served by the another eNB comprise at least one of:
   frequency band(s) served,
   cell transmit bandwidth,
   power control information,
   baseline cell common channel configurations,
   Multiple Input Multiple Output (MIMO) and directional antenna information, Multimedia Broadcast Multicast Service (MBMS) over a
    Single Frequency Network (MBMS SFN) information,
current operation status, and
MBMS resource information.

16. The eNB of claim 14, wherein service parameters for each cell served by the another eNB comprise at least one of:
MBMS information,
location services information, and
common system information shared among eNBs served by the another eNB.

17. The eNB of claim 12, wherein the processor is further configured to:
transmit, by the authenticated eNB to the core network, a request for the first parameters.

18. The eNB of claim 12, wherein the processor further:
transmits, by the authenticated eNB to the authenticated another eNB, a request for the second parameters.

19. The eNB of claim 12, wherein the information at least includes a unique Internet Protocol (IP) address and wherein the authentication of the eNB with the another eNB uses the unique IP address.

20. The eNB of claim 12, wherein authentication of the eNB with the another eNB includes either a handshake or paired request and response messages.

21. The eNB of claim 12, wherein the second interface is an X2 interface.

22. The eNB of claim 12, wherein the information identifying each of the plurality of cells served by the another eNB are cell-Ids.

* * * * *